March 31, 1925. 1,531,568
F. A. OLCOTT
COMBINED BUMPER AND BRACE
Filed Sept. 5, 1924 2 Sheets-Sheet 1
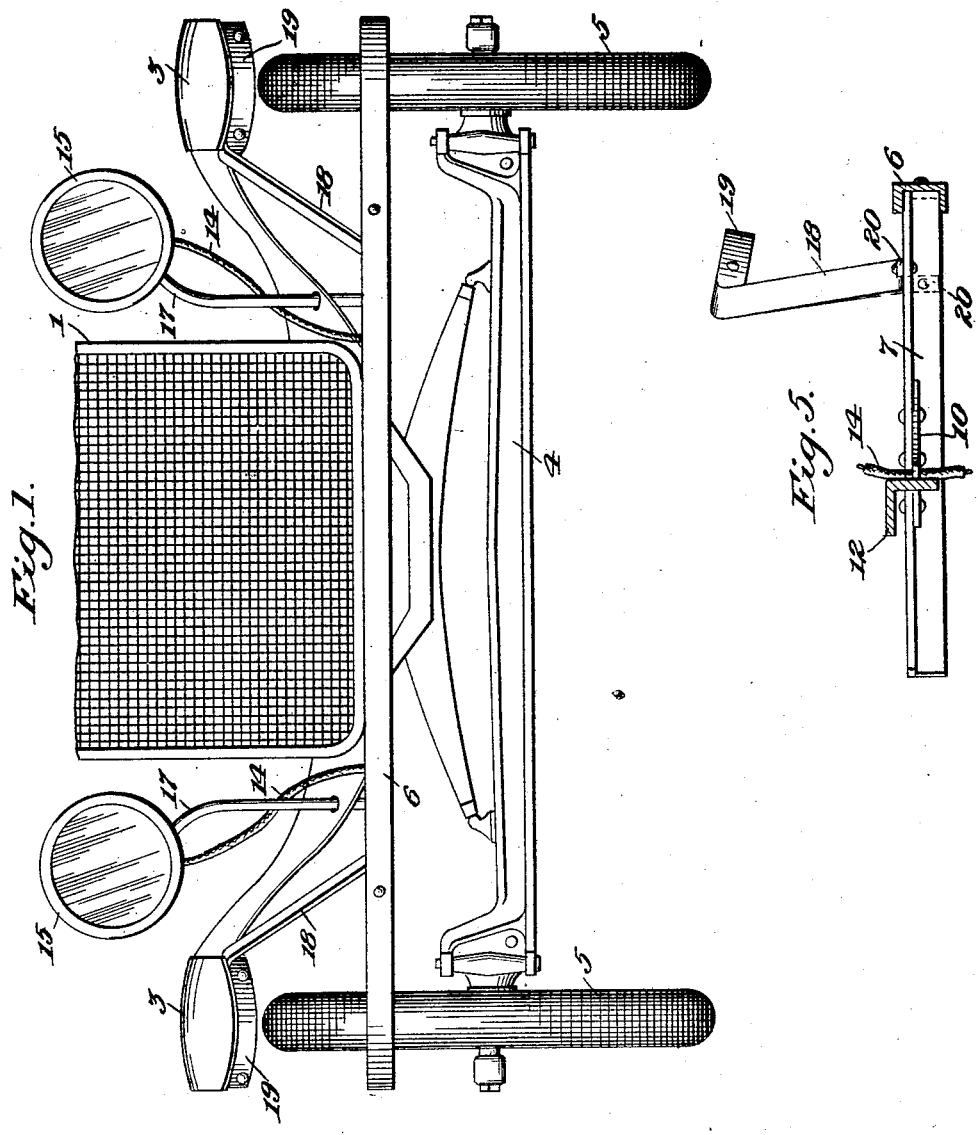
Inventor:
F. A. Olcott,
By Riordan & Riordan
Att'ys.

March 31, 1925. 1,531,568
F. A. OLCOTT
COMBINED BUMPER AND BRACE
Filed Sept. 5, 1924  2 Sheets-Sheet 2
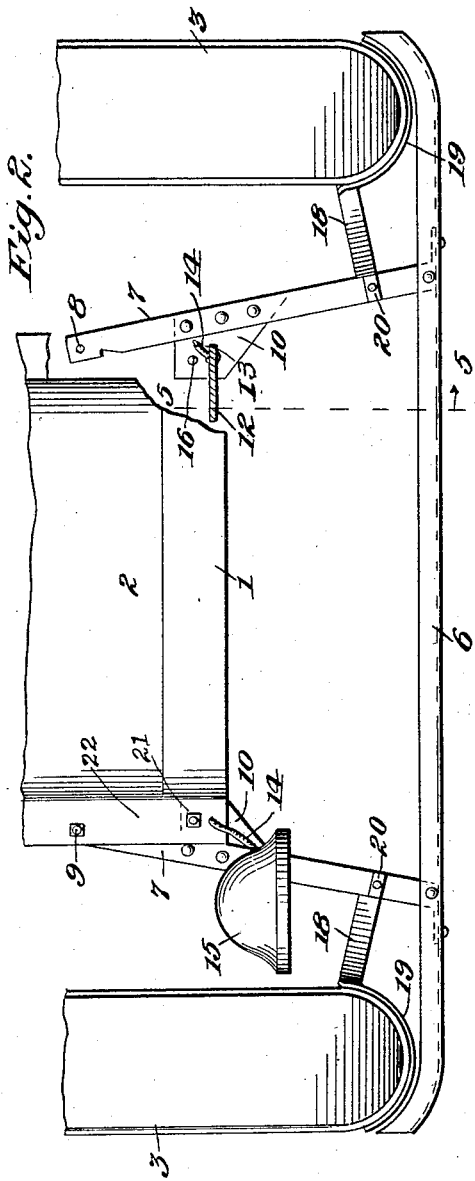
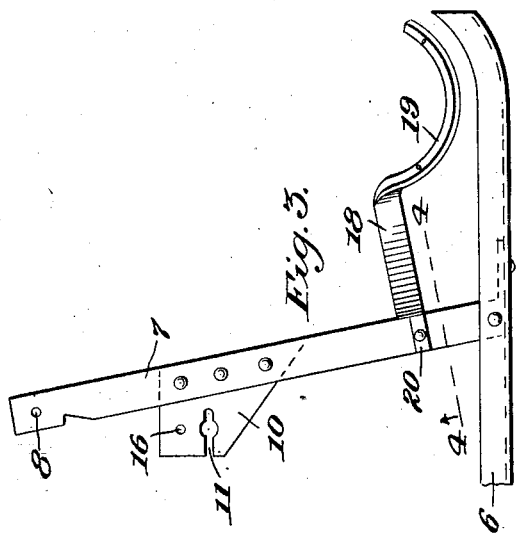
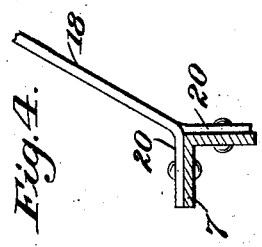
Inventor:
F. A. Olcott,
By Riordan & Riordan
Att'ys.

Patented Mar. 31, 1925.

1,531,568

UNITED STATES PATENT OFFICE.

FRANK A. OLCOTT, OF COLUMBUS, NEBRASKA.

COMBINED BUMPER AND BRACE.

Application filed September 5, 1924. Serial No. 736,127.

*To all whom it may concern:*

Be it known that I, FRANK A. OLCOTT, of Columbus, in the county of Platte and State of Nebraska, a citizen of the United States, have invented certain new and useful Improvements in Combined Bumpers and Braces, of which the following is a specification.

This invention relates to bumpers for automobiles of the type disclosed in Letters Patent No. 1482658 February 5, 1924, issued to me.

The present invention has special reference to certain features of construction and arrangement whereby the placing of the device in position on the vehicle is facilitated, and an economy in production is accomplished without any loss of strength, durability or efficiency.

The invention is illustrated in the accompanying drawings and will be hereinafter set forth.

In the drawings, Fig. 1 is a front elevation of a portion of an automobile having my present improvements applied thereto, Fig. 2 is a plan view of the same, Fig. 3 is an enlarged plan view of an end portion of the bumper bar, one supporting arm therefor, and the fender brace, Fig. 4 is a detail section on the line 4—4 of Fig. 3.

Fig. 5 is a section on the line 5—5 of Fig. 2.

The automobile, as an entirety, is not shown in the drawings as it forms no part of the invention, and the radiator 1, hood 2, fenders 3, axle 4 and wheels 5 are shown more or less conventionally and only to an extent which will aid in an understanding of the invention.

The bumper bar 6 is of channel formation, as shown most clearly in Fig. 5, and is disposed across the front of the vehicle with its ends in front of the wheels. The bumper bar is supported from the chassis of the vehicle by arms 7 which are preferably angle bars and are provided at their rear extremities with openings 8 to receive the bolts 9 which secure the hood cover board to the chassis. The front extremities of the arms 7 fit within the channel of the bumper bar and are riveted or bolted thereto, while rigidly secured to each arm, intermediate the ends thereof, is a gusset plate 10 which projects laterally therefrom toward the chassis of the vehicle to extend under the front corner of the same. The gusset plate has an open-ended slot 11 in its inner edge to receive the end of the vertical web of the front cross bar 12 of the chassis, and the walls of this slot are recessed or notched, as at 13, to accommodate the conductor 14 which carries current to the adjacent headlight 15. Adjacent its inner rear corner, the gusset plate is provided with an opening 16 to receive the headlight bracket 17.

To secure the device in position, the nuts 21 securing the headlight bracket and the front bolt of the hood cover board 22 are removed; the end of the arm 7 is then disposed under the side member of the chassis in such position that said bolt and bracket will engage through the openings 8 and 16, respectively, after which the nuts are restored and turned home.

Adjacent the front extremity of each arm 7 is secured a fender brace 18 consisting of a flat bar extending upwardly and outwardly from the supporting arm and having its upper end terminating in an arcuate portion 19 conforming to the front end of the fender 3 and rigidly secured thereto. The lower end of the brace 18 is split longitudinally defining feet 20 which are bent into divergent relation and secured one upon the top web of the arm 7 and the other against the side web of the arm, as shown most clearly in Fig. 4. The brace is thus very firmly secured to the arm, the feet of the brace reenforcing each other so that any tendency of the brace to rock upon one foot is resisted by the other foot.

Having thus fully described my invention, what I claim as new and desire to secure by Letters Patent of the United States is:—

1. The combination with an automobile chassis, of a bumper bar, supporting arms secured at their front ends to said bar and at their rear ends to the side members of the chassis, and gusset plates secured to the supporting arms between the ends thereof and to the side bars of the chassis, said gusset plates being engaged with the front cross bar of the chassis.

2. The combination with an automobile chassis, of a bumper bar, supporting arms secured at their front ends to the bumper bar and at their rear ends to the chassis, headlight brackets on the chassis, and gusset plates secured to the arms and engaging the front cross bar of the chassis, said gusset plates having openings at their rear corners to receive the ends of the headlight brackets whereby the plates may be connected to the brackets.

3. The combination with an automobile chassis, of a bumper bar, supporting arms secured at their front ends to said bar and at their rear ends to the side members of the chassis, and gusset plates secured to the supporting arms between the ends thereof and to the side bars of the chassis, said gusset plates being provided in their inner side edges with open-ended slots to engage the ends of the front cross bar of the chassis and having recesses in the walls of said slots to accommodate the current-conductors of the automobile headlights.

4. The combination of an automobile chassis, fenders, a bumper bar, supporting arms secured at their front ends to the bumper bar and at their rear ends to the chassis, and braces secured at their upper ends to the respective fenders and provided at their lower ends with angularly disposed feet secured one upon the top of the adjacent supporting arm and the other against the side of the arm.

In testimony whereof I hereunto affix my signature.

FRANK A. OLCOTT.